Patented Nov. 7, 1944

2,362,282

UNITED STATES PATENT OFFICE 2,362,282

METHOD OF ACETYLATING STARCH

Wesley N. Lindsay, Jackson Heights, N. Y.

No Drawing. Application September 12, 1942,
Serial No. 458,171

11 Claims. (Cl. 260—234)

This invention relates to chemistry and more particularly to chemical processes and has for its object the provision of an improved process of producting acetylated starch compounds and more particularly water soluble acetylated starch compounds having a desired viscosity.

Another object is to provide a method of producing acetylated starch compounds having an acetyl value within the range 4 to 30% and a determined viscosity within a relatively wide range of possible viscosities.

A further object is to provide a commercially practical method of producing acetylated starch compounds having an acetyl value within the range 6–12% and a determined viscosity within a relatively wide range of possible viscosities.

Other objects will be apparent as the invention is more fully hereinafter disclosed.

Acetylated starch compounds have heretofore been formed by suspending the substantially pure starch in a quantity of glacial acetic acid in large excess of that theoretically required and heating the suspension at its boiling point temperature for an extended time interval, maintaining the volume of the suspension substantially constant by frequent additions of acetic acid and regulating the time interval of heating to obtain the desired acetyl value in the acetylated starch product.

In the practice of this general method it has been found that two general classes of acetylated starch compounds may be formed; namely—

(1) Those which are water soluble and which have an acetyl value of from 4 to 30%; and (2) Those which are insoluble in water but soluble in one or more organic solvents and which have an acetyl value of from 30 to 44.8%.

However, I have found that in the group of acetylated starch compounds produced by this method which are soluble in water, namely, those having an acetyl value within the range 4 to 30%, the viscosity of the compounds at any given acetyl value within this range varies widely and varies inconsistently.

I have discovered that this variation in viscosity is caused by variations in the extent to which the starch is subjected to hydrolysis either prior to or during acetylation and that by the proper control of this factor water soluble acetylated starch compounds of any given acetyl value within the range 4 to 30% may be prepared with any desired viscosity within a relatively wide range of viscosities.

To enable one skilled in the art to comprehend the present invention it is pointed out that natural starch is recognized chemically as being a high molecular weight molecule consisting of a plurality of $C_6H_{10}O_5$ groups bound together in a regular polymeric structure, the precise form of which is at present unknown. The starch molecule ordinarily contains about 12% water which is removable therefrom by careful and extended drying at temperatures not over about 60° C. When starch is heated to temperatures above about 60° C. the long chain polymeric structure of the molecule breaks up into shorter chain length structures, the extent and rapidity of which varies with the temperature and the time of heating, and may ultimately be decomposed into the short chain polymeric structure known in the art as "dextrine." This decomposition of the polymeric long chain starch molecule into shorter chain length molecules may be accomplished in other ways, as one skilled in the art well knows and is known generally in the art as "degradation."

"Degraded" or depolymerized starch differs from starch in one essential particular, namely, in being soluble in cold water to an extent which increases with increase in the degree or extent of degradation. Dextrine, for example, is completely soluble in cold water.

With these known facts in mind, it is believed apparent that when starch granules are suspended in an acetic acid solution and the suspension is heated to the boiling point of the solution, hydrolysis and depolymerization may occur simultaneously with acetylation, the extent of which depends upon the amount of water present in the solution and the temperature and time at temperature.

Hydrolysis of the starch can only be avoided by completely eliminating water from the acetic acid solution during the acetylation reaction. Depolymerization can only be avoided by maintaining an acetylation temperature below about 60° C.

In accordance with the present invention, I propose either to avoid completely hydrolysis or else to maintain a substantially constant rate of hydrolysis during acetylation; and further propose to limit the extent of depolymerization of the starch molecule by limiting the time and temperature to the minimum required to obtain the desired percent acetyl value and the desired viscosity acetylated product.

In this connection, the viscosity of the acetylated starch at any given acetyl value within the range 4 to 30% has been found to vary with variation in the extent of hydrolysis and with the extent of depolymerization, decreasing with increase in the extent to which the starch molecule becomes either hydrolyzed or depolymerized. Accordingly, at any given acetyl value the maximum viscosity acetylated starch is obtained with the minimum hydrolyzed and/or depolymerized starch.

In the practice of the present invention, the extent of hydrolysis of the starch is controlled or regulated by maintaining a substantially constant boiling point acetic acid solution within the range 110° to 118° C. by means of additions of acetic anhydride to the solution throughout the time interval of heating and by preventing the escape of water vapor or of acetic acid from the solution during the time interval of heating. An acetic acid solution having a boiling point of 110° C. has an acetic acid concentration of about 80%. An acetic acid solution having a boiling point of 118° C. has an acetic acid concentration of about 100%.

When starch is acetylated in a substantially constant boiling point solution within the boiling point range 110° to 118° C., the rate of acetylation decreases with decrease in temperature, and at any given temperature increases with increase in the extent to which the starch has previously been depolymerized. Ordinarily, however, the decrease in the rate of acetylation with decrease in temperature is offset in part by the increase in the rate of hydrolysis with decrease in acetic acid concentration due to the greater amount of water present. As starch depolymerization will occur at any of the temperatures of heating (110–118° C.) employed in the acetylation process, it is desirable, particularly in the production of the higher acetyl value starch compounds to depolymerize the starch prior to acetylation as the rate of acetylation thereby is increased with resultant shortening of the time factor at the desired acetylating temperature thus providing for a resultant closer control over the molecular weight of the final acetylated starch product by controlling the length of the chain of $C_6H_{10}O_5$ groups contained in the final acetylated starch compound. This is particularly important in the production of water soluble acetylated starch compounds as the length of the chain of $C_6H_{10}O_5$ groups contained in the acetylated starch molecule is reflected in the viscosity of the compound when in aqueous solution.

In view of the above explanation of the present invention it is believed apparent that by a proper control of the two factors (1) hydrolysis and (2) extent of depolymerization, acetylated starch compounds having a wide range of chain lengths of $C_6H_{10}O_5$ groups may be formed, which in the case of the water soluble acetylated starch compounds will be directly reflected in the viscosity of the compounds in aqueous solution.

In accordance with the present invention it is proposed to acetylate the starch by reacting the same with acetic acid at elevated temperatures within the range 110° to 118° C. in the presence of a determined amount of water, regulating the time at temperature to obtain the desired acetyl value, particularly in the forming of the higher acetyl value acetylated starch compounds, by depolymerizing the starch molecule to a determined degree prior to acetylation.

In the practice of the present invention, the starch which has been depolymerized to a determined extent ranging from zero percent to that extent required to form the completely water soluble depolymerized product known as "dextrine," is suspended in an aqueous solution of acetic acid having an acetic acid concentration within the range 80% to 100% corresponding to a boiling point range of 110° to 118° C., the total amount of acetic acid present being approximately equal in weight of the starch and substantially in excess of that theoretically required to acetylate the starch to the percent desired, and the suspension is placed in a suitable container closed to the atmosphere but provided with a reflux condenser means to prevent the escape of water and acetic acid vapors from the container. The suspension is then heated by any convenient means to the boiling point of the acetic acid solution for the time interval required to produce the desired acetyl value in the acetylated starch product and during this time interval the boiling point of the solution is maintained substantially constant at the desired acetylating temperature within the range 110°–118° C. by adding acetic anhydride to the solution. The acetic anhydride additions are made in such amounts as is required to combine with the water liberated during the acetylation reaction to form acetic acid of the desired concentration at the boiling point temperature selected.

At the conclusion of the desired time interval, the excess acetic acid present in the solution is recovered from the acetic acid solution in any convenient manner, as by removing the acetic acid by vacuum distillation or by precipitating the acetylated starch product from the acetic acid solution by means of a liquid in which the acetylated starch product is insoluble.

As a specific example of the practice of the present invention, but not as a limitation thereof, the adaptation of the same to the production of relatively low acetyl value starch acetates of varying viscosities will be described. These starch acetate compounds have heretofore been found to be excellent noncottoning agents for addition to dextrine adhesives for the purpose of inhibiting or eliminating threading of the adhesive, as described and claimed in my copending application Serial No. 414,095 filed October 8, 1941, which application is assigned to the same assignee as the present invention. For such purposes, the acetylated starch product preferably should have an acetyl value within the range of 100 centistokes for a 20% solution at the thinner end and 100 centistokes for a 2% solution at the heavier end.

Acetylated starch compounds of this type are formed in accordance with the present invention in the following manner:—

Twenty (20) pounds of aqueous acetic acid (B. P. 109° C.) and 4.5 pounds of acetic acid anhydride were placed in a Pfaudler five (5) gallon glass lined agitated still equipped with a reflux condenser. To this solution was added eighteen (18) pounds of tapioca starch having a moisture content of 1–2%.

The starch-acetic acid solution was heated to the boiling point of the solution (114° C.) and was maintained at this boiling point for a period of 3 hours. Acetic anhydride to a total of 1250 c. c. was added slowly to the solution during this time interval to maintain the boiling point of the solution substantially constant within the range 114–115° C.

At the end of this time interval, the excess acetic acid solution present in the still was removed by vacuum distillation at a pressure of 3 inches of mercury and the starch acetate residue remaining was dried with air preheated to a temperature of about 130° C. for an extended time interval necessary to remove all but the last traces of acetic acid from the starch acetate product.

The acetyl content of the starch acetate thus obtained was found to be 7.0% and the viscosity of the starch acetate in a solution containing 1 part acetate to 5 parts water approximated 100 centistokes at 25° C.

By increasing the B. P. of the acetic acid solution to 118° C., the acetyl value of the starch acetate may be increased to about 8.0% and the viscosity of the starch acetate increased to about 500 centistokes in a solution containing 1 part of the acetate to 10 parts of water at 25° C.

By lowering the B. P. of the acetic acid solution to 112° C. a longer time interval is required to obtain an acetyl value within the range 7–8% desired. A starch acetate of an acetyl value approximating 8% may be obtained in about 7 hours, which acetate will have a viscosity approximating 100 centistokes in a solution containing 1 part acetate to 3 parts water at 25° C.

In the practice of the above specific example, where the starch employed is substantially un-depolymerized, such as for example, by extended drying at 60° C., the higher the boiling point acetic acid solution employed the higher the viscosity of the acetylated product formed, and acetylated starch (acetyl value 7 to 8%) having a viscosity as high as 100 centistokes in a 6% water solution may easily be obtained with an acetic acid solution having a boiling point approximating 118° C. Conversely, the greater the degree of depolymerization the lower the viscosity of the acetylated starch product even at the highest boiling point acetic acid solution (118° C.). Thus with a depolymerized starch of the type known as "dextrine," starch acetates having a viscosity as low as 30 centistokes in a 30% water solution may be readily obtained even with the highest boiling point acetic acid solution.

As the rate of acetylation increases with increase in depolymerization to maintain substantially constant acetyl values it is necessary to shorten the time at temperature with increase in the extent of depolymerization. In general, depolymerization to an extent providing a solubility in cold water of up to about 5% has been found to be most effective for the purposes of shortening the time interval of acetylation to the extent desired in the forming of the low acetyl value starch acetates, particularly when the temperature of acetylation is lowered to 110° C., and wherein an acetylated product having an acetyl value within the range 6 to 12% and a viscosity within the range desired for non-cottoning agents also is desired. As hereinabove disclosed, as the concentration of the acetic acid solution decreases within the range 110–118° C. the amount of starch hydrolysis increases and the viscosity of the acetylated starch product decreases. Hence, where it is desired, as indicated in the last example above given, to form an acetylated starch product of relatively low viscosity at a temperature within the range 110°–118° C. the time interval of heating to obtain the desired acetyl value may be materially reduced by depolymerizing the starch prior to acetylation.

As an example, starch depolymerized at 120° C. to a moisture content of about 1.6% and a solubility in cold water of about 2%, has been found to be acetylated to an acetyl value of 7 to 8% within a time interval of about 2 hours at a temperature of 118° C. to produce an acetylated starch product having a viscosity of about 150 centistokes in a 16% aqueous solution at 25° C.

At 110° C., this same depolymerized starch will acetylate to the same acetyl value in about 5 hours to produce an acetylated starch product having a viscosity of about 100 centistokes in a 25% aqueous solution at 25° C.

At 114° C., this same depolymerized starch will acetylate to the same acetyl value in 3½ hours to produce an acetylated starch product having a viscosity of about 100 centistokes in a 20% aqueous solution at 25° C.

As another example, following the above described method, and using raw starch containing up to 12% water, a starch acetate having an acetyl value of about 7 to 8% may be obtained in from 2 to 3 hours in an acetic acid solution having a constantly maintained boiling point of 118° C. which will consistently and reproducibly have a viscosity approximately 500 centistokes in 9% aqueous solution at 25° C.

The same raw starch product in an acetic acid solution having a constantly maintained boiling point of 110° C. will give a starch acetate having an acetyl value of between 7–8% in from 7 to 8 hours which will consistently and reproducibly have a viscosity of 100 centistokes in 25% aqueous solution at 25° C.

Intermediate viscosity starch acetates of the same acetyl value may be obtained at intermediate temperatures, the time at temperature decreasing with increase in temperature in a somewhat regular manner.

It is believed apparent that whereas the above specific examples are limited to the lower acetyl value starch acetates, by extending the time interval of heating sufficiently starch acetates of any desired acetyl value may be obtained.

In general, I have found that the rate of acetylation increases with increase in the extent to which the starch is depolymerized prior to acetylation. Where water soluble starch acetates of the higher acetyl values are desired, it has generally been found desirable to limit the extent of depolymerization to not over 5% soluble in cold water for the reason that the solubility of the starch acetate in acetic acid solutions increases with increase in depolymerization complicating the ready removal of the excess acetic acid from the acetylated starch by vacuum distillation as above described. However, where acetic acid separation by vacuum distillation is not necessarily to be practiced, this limitation is not important, and the extent of depolymerization prior to acetylation may be to any extent adapted to produce the desired molecular weight acetylated starch product of the desired acetyl value within an economically practical time interval of heating.

Having hereinabove described the present invention generically and specifically and given several specific examples of the practice of the same and of several contemplated modifications thereof, it is believed apparent that the same may be widely modified without essentially departing therefrom and all such are contemplated as may fall with the scope of the following claims.

What I claim is:

1. The method of producing acetylated starch compounds which comprises suspending the starch in an acetic acid solution having a boiling point within the range 110–118° C. the total amount of acetic acid in said solution being substantially in excess of that theoretically required to provide the desired acetyl value in the said starch on acetylation and heating the said suspension to the boiling point of the said solution for an extended time interval adapted to give the desired acetyl value to the said starch, maintaining during said heating time interval a substantially constant boiling point in said solution within the said range 110° to 118° C.

2. The method of claim 1, wherein the said substantially constant boiling point is maintained in said solution by conducting the heating of the solution under a reflux condenser preventing the escape of water and acetic acid vapors from the solution and wherein additions of acetic acid anhydride are made to the solution during said heating time to maintain the acetic acid concentration of the solution at the value required to provide the desired boiling point solution.

3. The method of claim 1, wherein prior to suspending the starch in said acetic acid solution the water content of the said starch is lowered to a relatively low percent without substantial depolymerization of the starch molecule.

4. The method of claim 1, wherein prior to suspending the said starch in said acetic acid solution the said starch is dehydrated and depolymerized, the extent of depolymerization being that producing a depolymerized starch having from at least a slight solubility in cold water to substantially complete solubility in cold water.

5. The method of claim 1, wherein prior to suspending the said starch in said acetic acid solution the said starch is depolymerized to an extent not exceeding that producing a solubility of about 5% in cold water.

6. The method of claim 1, wherein the time interval of heating is limited to that producing an acetyl value not in excess of about 30%.

7. The method of claim 1, wherein the time interval of heating is limited to that producing an acetyl value within the range 6 to 12%.

8. The method of claim 1, wherein prior to suspending the said starch in said acetic acid solution the said starch is depolymerized by heating to a temperature of about 120° C. for a time interval providing a depolymerized starch product having not over a 5% solubility in cold water and wherein the time interval of heating at the boiling point of said acetic acid solution is limited to that providing an acetyl value of not over 30%.

9. The method of claim 1, wherein prior to suspending the said starch in said acetic acid solution the said starch is depolymerized by heating to a temperature approximating 120° C. to an extent providing a depolymerized starch having a solubility in cold water of not over 5%, and wherein during the said heating the surface of the said acetic acid solution is enclosed from the atmosphere by a reflux condenser preventing the escape therefrom of water and acetic acid vapors, and wherein during the said heating time the boiling point of the said solution is maintained constant by additions of acetic acid anhydride thereto, and wherein the time interval of heating is limited to a time required to produce an acetyl value within the range 6–12% in the acetylated starch product being formed.

10. The method of claim 1, wherein the time interval of heating at said constantly maintained boiling point is limited to a time interval required to obtain a starch acetate having an acetyl value substantially not in excess of that value providing an appreciable solubility of the starch acetate in the acetic acid solution employed and wherein the excess acetic acid solution present is in major part removed by vacuum distillation and the residual acetic acid remaining is removed by means of a current of air preheated to a temperature at which the said acetic acid has an appreciable vapor pressure, said air being passed over and through the said starch acetate for an extended time interval.

11. The method of claim 1, wherein the time interval of heating at said constantly maintained boiling point is limited to a time interval producing a starch acetate having an acetyl value within the range 6 to 12% and wherein at the end of said time interval the starch acetate-acetic acid suspension is subjected to vacuum distillation at elevated temperatures for a time interval adapted to remove the greater bulk of the acetic acid present therein and is thereafter subjected to extended air drying in a current of air preheated to temperatures approximating 130° C. to remove the remainder of the said acetic acid to the residual percentage desired therein.

WESLEY N. LINDSAY.